United States Patent [19]

Stuyts

[11] Patent Number: 5,056,024
[45] Date of Patent: Oct. 8, 1991

[54] APPARATUS FOR TESTING THE WHEEL SUSPENSION OF A VEHICLE

[75] Inventor: Victor C. L. H. Stuyts, Haarlem, Netherlands

[73] Assignee: Initial Investments, B.V., Antilles, Netherlands

[21] Appl. No.: 405,738

[22] Filed: Sep. 11, 1989

[30] Foreign Application Priority Data

Sep. 13, 1988 [NL] Netherlands ............... 8802251

[51] Int. Cl.$^5$ .......................................... G01M 17/04
[52] U.S. Cl. ........................ 364/424.03; 364/424.04; 73/11
[58] Field of Search ............ 364/424.03, 424.04, 364/424.05, 550, 551.01; 73/11, 12, 669

[56] References Cited

U.S. PATENT DOCUMENTS

| 3,855,841 | 12/1974 | Hunter | 73/11 |
| 3,981,174 | 9/1976 | Himmler | 73/11 |
| 4,002,051 | 1/1977 | Hilbrands | 73/11 |
| 4,103,532 | 8/1978 | Buzzi | 73/11 |
| 4,376,387 | 3/1983 | Stevens et al. | 73/11 |
| 4,703,645 | 11/1987 | Hudacsek et al. | 73/11 |

Primary Examiner—Gary Chin
Attorney, Agent, or Firm—Lorusso & Loud

[57] ABSTRACT

An apparatus for testing the wheel suspension of a vehicle in the frequency domain, in particular the shock absorbing element of said suspension, comprises a measuring plate, a mechanism for oscillating the measuring plate with a frequency varying in a predetermined range, for example from 0–25 Hz, a measuring device for measuring the vertical forces exerted by a tire of the vehicle on the measuring plate, a memory for storing the measured force values and a logic circuit for processing the measured force values. The apparatus stores both the frequency values corresponding to the measured force values and a mathematical model of a linear second order mass spring system formed by the unsprung mass, the tire and the shock absorbing element, and determines the minimum force value and corresponding frequency value from the stored measured force values and corresponding frequency values. The apparatus uses the mathematical model to compute a relative damping factor from the minimum measured force value and corresponding frequency value.

5 Claims, 3 Drawing Sheets

APPARATUS FOR TESTING THE WHEEL SUSPENSION OF A VEHICLE

The invention relates to an apparatus for testing the wheel suspension of a vehicle in the frequency domain, in particular the shock absorbing element of said suspension, comprising a measuring plate, a mechanism for oscillating said measuring plate with a frequency varying in a predetermined range, for example from 0-25 Hz, a measuring device for measuring the vertical forces exerted by a tyre of the vehicle on the measuring plate, a memory for storing the measured force values and a logic circuit for processing the measured force values.

The oscillation frequencies to which the wheel suspension of a vehicle is exposed during normal use on the road, are located in a range from 0 up to approximately 25 Hz. In this frequency range the wheel suspension generally shows two resonances; the resonance of the sprung mass and the resonance of the unsprung mass. At the resonance frequency of the unsprung mass which is located approximately between 12 and 17 Hz, a minimum remanent vertical force exerted by the wheel on the measuring plate, can be determined. With the known apparatus of the above-mentioned type conclusions are drawn from said minimum remanent force with respect to the operation of the shock absorbing element. However the known apparatus has the disadvantage that these conclusions are not always correct because the minimum remanent vertical force is—apart from the shock absorbing element—also affected by other variables in the construction of the vehicle.

It is an object of the invention to provide an apparatus of the above-mentioned type wherein this disadvantage is obviated.

To this end the apparatus according to the invention is characterized by means for storing the frequency values corresponding with said measured force values, means for storing a mathematical model of a linear second order mass spring system formed by the unsprung mass, the tyre and the shock absorbing element, means for determining the minimum force and corresponding frequency values from said stored measured force and corresponding frequency values, and means for computing a relative damping factor from said minimum measured force and corresponding frequency values by means of said model.

In this manner a relative damping factor can be computed from the measuring result, which damping factor can subsequently be compared with a design factor which is typical for the type of vehicle tested, i.e. which should apply to a brand-new vehicle.

By means of the mathematical model it is also possible to compare the measured minimum remanent vertical force at the resonance frequency of the unsprung mass for the type of vehicle tested with an optimum value, i.e. the minimum remanent vertical force which could be obtained if the wheel suspension would have a typical (brand-new) relative damping constant. It is also possible to represent the measured value as a fraction of the optimum value.

The invention will be further explained by reference to the drawings.

FIG. 1 schematically shows the wheel suspension of a vehicle, with an embodiment of the apparatus according to the invention.

Figure 1:
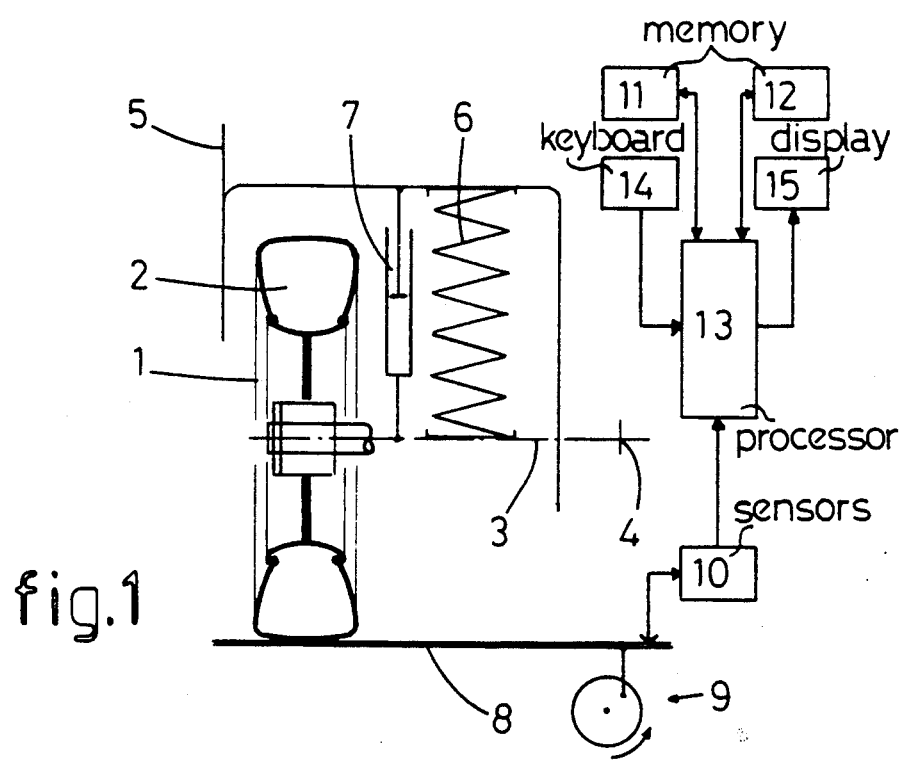

Referring to FIG. 1 there is shown schematically the wheel suspension of a vehicle. A wheel 1 with a tyre 2 is attached to a support arm 3 which is fixed by means of a hinge 4 to a vehicle body 5. A body supporting spring 6 and a shock absorber 7 are provided between the body 5 and the support arm 3. The spring 6 is intended to constantly maintain contact with the road surface and to provide comfort despite roughness of the road surface. The shock absorber 7 absorbs the surplus of movement energy of the wheel 1 and the support arm 3.

Figure 2:
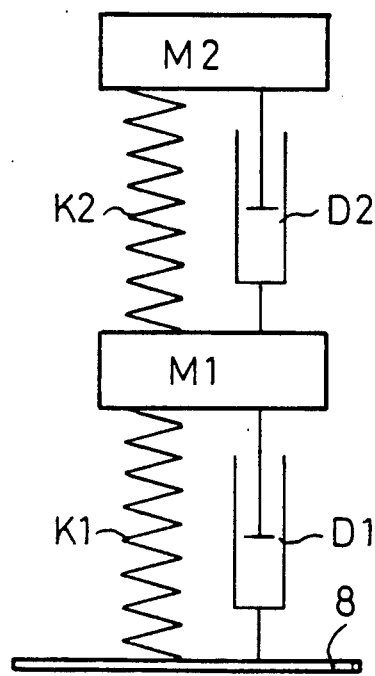
FIG. 2 shows a known model for the wheel suspension of FIG. 1.

Generally the wheel suspension can be represented mathematically by a model according to FIG. 2. In FIG. 2 M2 is that part of the body mass which is supported by the corresponding wheel, which is called the sprung mass. By M1 the mass of the wheel, the tyre, the braking system and a part of the mass of the spring, the shock absorber and the support arm is indicated. This mass M1 is also indicated as the unsprung mass. K2 is the spring between the sprung mass and the unsprung mass and D3 is the shock absorber. K1 and D1 are characteristics of the tyre used, the spring stiffness and the internal damping, respectively.

For testing the wheel suspension the wheel of the vehicle is driven on a wheel supporting platform or measuring plate, which is indicated by the reference number 8 in FIGS. 1 and 2. This measuring plate 8 can be made to oscillate by means of a schematically indicated excitation mechanism 9. Such excitation mechanisms are known per se and are for example disclosed in German Offenlegungsschrift 3,320,570, U.S. Pat. No. 3,937,058 and French patent 2,575,827.

Figure 3:
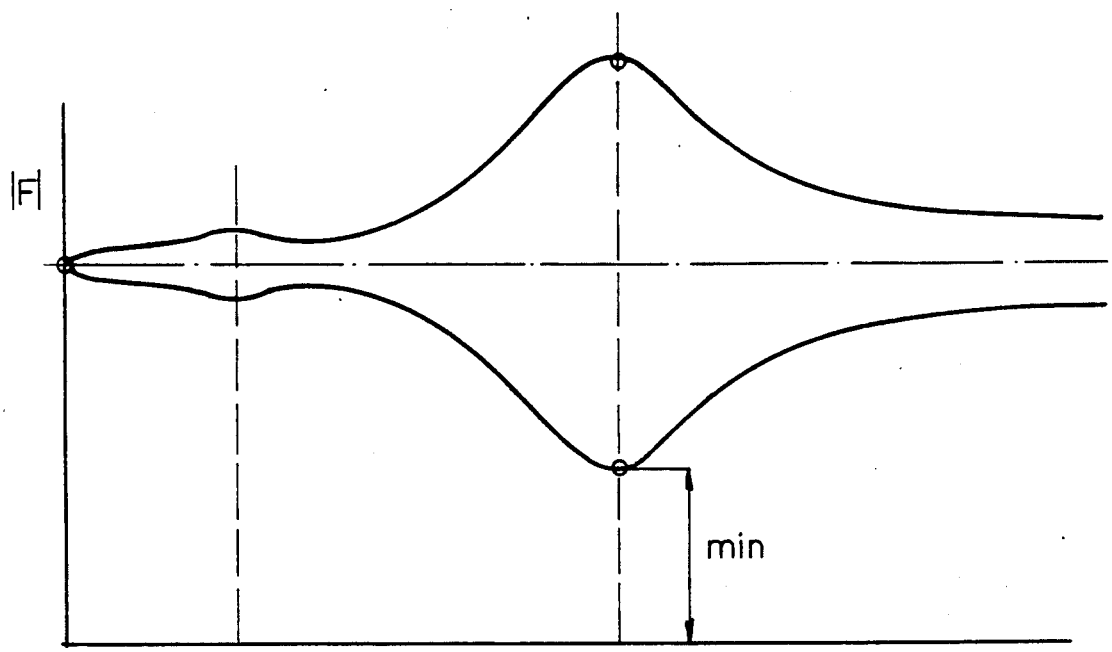
FIG. 3 shows the force exerted by the wheel on the measuring plate as a function of the frequency.

The oscillation of the measuring plate commonly has a constant amplitude of for example 3 mm and passes through a frequency range including the resonance frequencies of both the sprung mass and the unsprung mass, for example a range from 0 up to 25 Hz. The wheel suspension is made to oscillate by the oscillating measuring plate and the wheel will exert a harmonic force on the measuring plate 8. In the embodiment described the measuring plate 8 is made as an electronic scale so that the amplitude of the exerted force, the dynamic weight, can be measured at different frequencies. In FIG. 3 there is shown an example of the envelope of such an amplitude characteristic. Generally two resonance frequencies can be distinguished: $\omega_L$ is the resonance frequency of the sprung mass and lies approximately between 1 and 2 Hz, $\omega_H$ is the resonance frequency of the unsprung mass and lies approximately between 12 and 17 Hz.

As appears from FIG. 3, a minimum vertical remanent force occurs at the resonance frequency $\omega_H$, which remanent force as normalized by the average value of the force or the static force, is used as an indication for the quality and the safety of the system of the wheel suspension parts in general and the shock absorber in particular in many known test apparatus. As already mentioned above, the known apparatus however do not always provide the desired results because this minimum remanent vertical force is affected by the overall vehicle design, i.e. by all elements in the wheel suspension.

Figure 4:
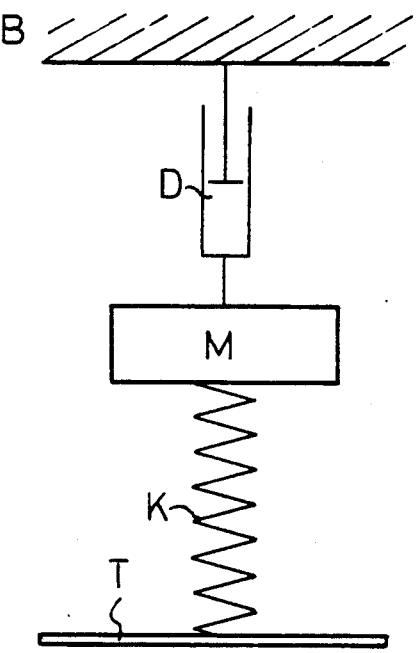
FIG. 4 shows the linear second order model according to the invention.

The apparatus according to the invention is distinguished in that by means of a simplified mathematical model of the second order for the wheel suspension reference values can be derived for evaluating the wheel suspension. The model used is shown in FIG. 4. It was found that this model represents the performance of the wheel suspension in the range around the resonance frequency $\omega_H$ with sufficient accuracy for testing the wheel suspension. In FIG. 4 the body of the vehicle is indicated by B, for which body it is assumed in the model that the same is immovable. M is the unsprung mass and T is the measuring plate 8 oscillating harmonically with an amplitude E and a frequency $\omega$. The spring indicated in FIG. 2 by K2 between the sprung mass and the unsprung mass is thought included in the more rigid spring formed by the tyre which is indicated by K. Finally the small damping in the tyre is neglected with respect to the shock absorber D as usual.

For this model according to FIG. 4 it can be derived that for a harmonic excitation $E.e^{(j\omega t)}$ applies:

$$\left| \frac{F(P,Z)}{K \cdot E} \right|^2 = \frac{P^2 + 4Z^2}{((1 - P^2)^2/P^2) + 4Z^2} \quad (1)$$

wherein:

F is the amplitude of the vertical force exerted on the measuring plate;

K is the spring coefficient of the tyre;

E is the amplitude of the excitation by the measuring plate;

$P = \omega/\omega_0$ is the normalized frequency;

$\omega$ is the circular frequency;

$\omega_0 = SQRT(K/M)$ is the resonance frequency of the undamped second order system;

$Z = D/(2M\omega_0)$ is the relative damping factor of the second order system.

Further, M is the unsprung mass and D the absolute damping value of the shock absorber D.

From this equation (1) it can be derived that for $P = SQRT(2)/2$ the equation (1) is independent of the relative damping factor Z and is equal to 1. Therefore for the frequency at which $P = SQRT(2)/2$, which frequency is indicated as $\omega_{ref} = \omega_0/(SQRT(2))$ it applies: $|F| = K.|E|$. This is also the value for $P \to \infty$. All frequency characteristics therefore pass through the point $P = SQRT(2)/2$ which will be used as reference value.

Further it can be derived from equation (1) that the resonance peak moves as function of the relative damping factor Z:

$$P(Z) = SQRT(\tfrac{1}{2} + \tfrac{1}{2}SQRT(1 + 8Z^2)) \quad (2)$$

Figure 5:
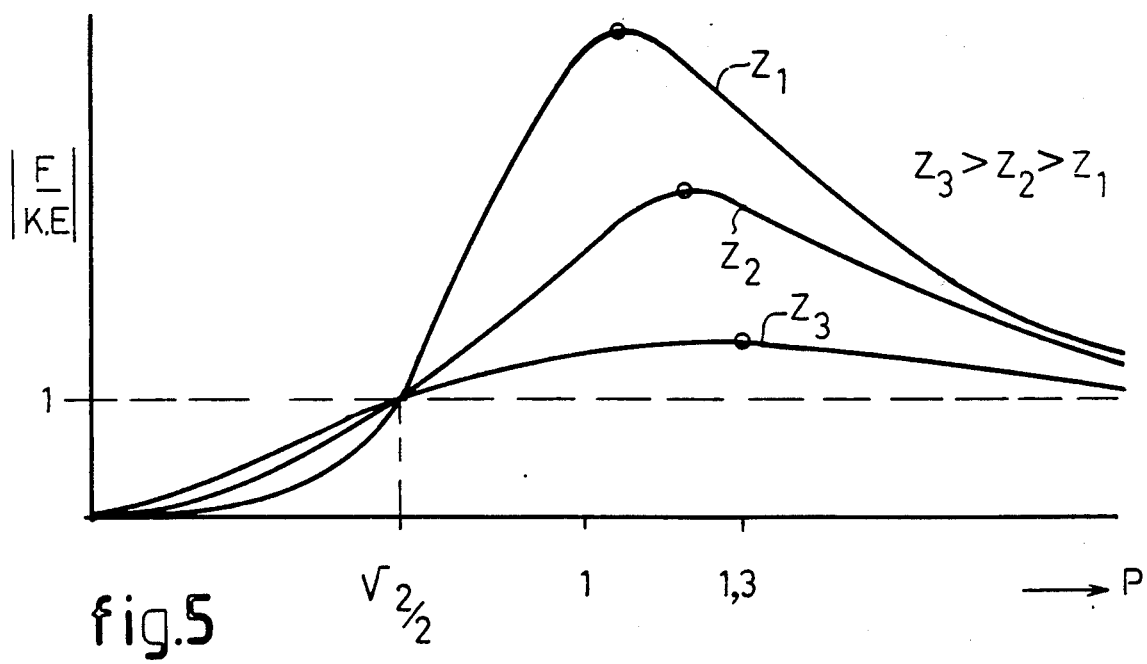
FIGS. 5 and 6 show some curves to explain the mathematical model according to the invention.

A graph of the amplitude characteristics of (1) is shown in FIG. 5 for different values of Z.

According to the invention the wheel is made to oscillate with a varying frequency by means of the measuring plate 8, wherein the amplitude-frequency curve of the vertical force F (see FIG. 3) is measured by means of sensors 10 and the measured force and frequency values are stored in a memory 11. From this measuring result an approximated value of the relative damping factor Z can be computed by means of the above-mentioned model according to the equations (1) and (2).

This computed relative damping factor can then be compared with a relative damping factor for this type of vehicle of which the wheel suspension is tested, which is typical in practice. By using the value of the amplitude $|K.E|$ in the point $P = \tfrac{1}{2}SQRT(2)$ it is possible to compute the optimum value of the minimum remanent vertical force during resonance for a predetermined damping factor (in case of a brand-new vehicle) and to represent the actual measured force value as fraction of the optimum value.

An example of an algorithm for computing the relative damping factor from a measured amplitude-frequency curve will be discussed hereinafter.

When the measuring plate 8 has passed the frequency range from 0 up to approximately 25 Hz, the apparatus has stored a measuring value table with period times (inverse frequencies) and corresponding absolute or relative weight or force amplitudes in the memory 11:

T(i) period time of period i.

F(i) relative amplitude of period i.

The table of measuring values T(i), F(i) is ordered in such a manner that the period times are monotonously increasing.

Due to the damping the observed resonance peak $\omega_H$ is located at a higher frequency than the resonance frequency of the free undamped system (see equation (2) and FIG. 5).

For determining the relative damping factor Z the above-mentioned frequency $\omega_{ref}$ is used, where the amplitude F is not dependent on the relative damping factor.

Figure 6:
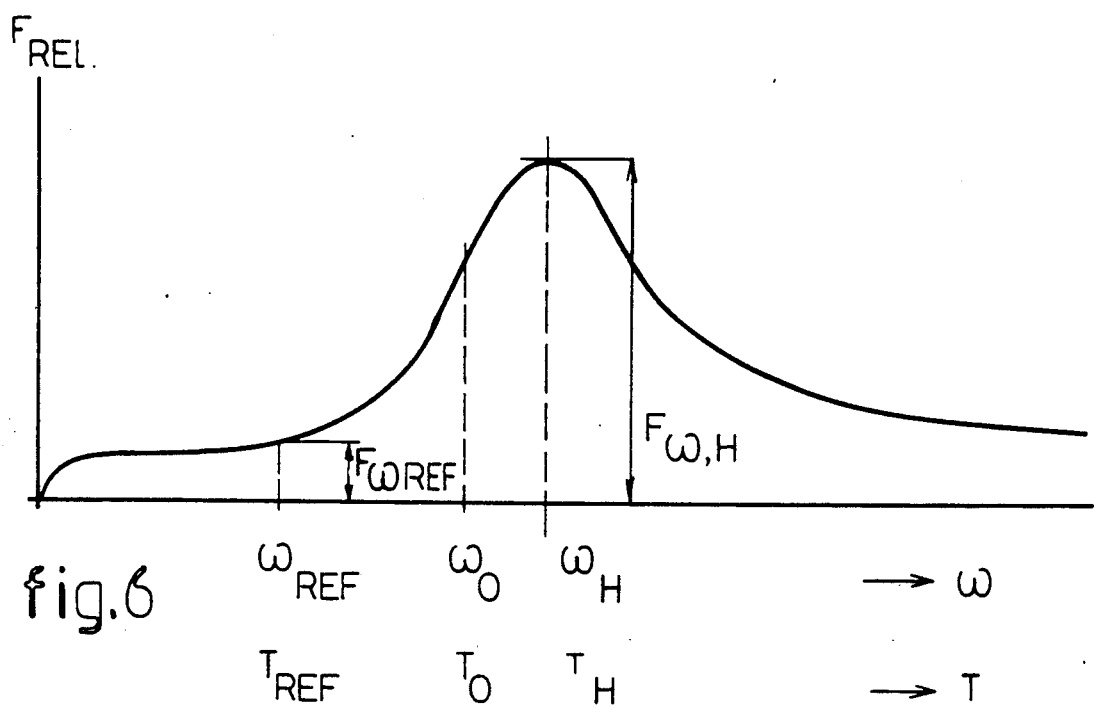

An amplitude ratio $R(Z) = |F(\omega_{ref})/|F(\omega_H)|$ can be computed for a series of Z values by substitution of equation (2) in equation (1) (see FIG. 6). A frequency ratio Q(Z) defined as: $Q(Z) = \omega_H/\omega_{ref} = P(Z) \cdot SQRT(2)$ can also be computed for this series of values of Z. These values R(Z) and Q(Z) are computed once by means of the above-mentioned model and are stored permanently in a table in a memory 12 for use as reference later on. The computed values are indicated in the following table I:

TABLE I

| Z | Q(Z) | R(Z) |
|---|---|---|
| .02 | 1.415 | .0400 |
| .04 | 1.416 | .0797 |
| .06 | 1.419 | .1189 |
| .08 | 1.423 | .1575 |
| .10 | 1.428 | .1952 |
| .12 | 1.434 | .2319 |
| .14 | 1.441 | .2673 |
| .16 | 1.448 | .3015 |
| .18 | 1.457 | .3344 |
| .20 | 1.466 | .3658 |
| .22 | 1.476 | .3957 |
| .24 | 1.486 | .4243 |
| .26 | 1.497 | .4514 |
| .28 | 1.509 | .4770 |
| .30 | 1.520 | .5014 |
| .32 | 1.533 | .5243 |
| .34 | 1.545 | .5461 |
| .36 | 1.558 | .5466 |
| .38 | 1.571 | .5859 |
| .40 | 1.584 | .6042 |
| .42 | 1.598 | .6215 |
| .44 | 1.611 | .6377 |
| .46 | 1.625 | .6531 |
| .48 | 1.639 | .6676 |
| .50 | 1.653 | .6813 |
| .52 | 1.667 | .6942 |
| .54 | 1.681 | .7064 |

TABLE I-continued

| Z | Q(Z) | R(Z) |
|---|------|------|
| .56 | 1.695 | .7180 |
| .58 | 1.709 | .7289 |
| .60 | 1.723 | .7392 |
| .62 | 1.737 | .7490 |
| .64 | 1.752 | .7583 |
| .66 | 1.766 | .7671 |
| .68 | 1.780 | .7755 |
| .70 | 1.794 | .7834 |

The relative damping factor Z for the measured amplitude-frequency curve is determined by a processor 13 by iteration by means of this table I. Every iteration step is as follows:

Step 1: Take a Z-value from table I, for example Z=0.35.

Step 2: Retrieve from the table of measuring values T(i), F(i) the resonance period $T_H$ and determine the period $T_{ref}(Z) = T_H \cdot Q(Z)$, wherein Q(Z) is retrieved from table I for the assumed value of Z.

Step 3: Retrieve from the table of measuring values T(i), F(i) the amplitude $F(\omega_{ref}, Z)$ corresponding with the period $T_{ref}(Z)$ determined in step 2.

Step 4: Compute the amplitude ratio $$R'(Z) = F(\omega_{ref})/F(\omega_H)$$

Step 5: Compare the value R'(Z) found with the value R(Z) of table I for the assumed value of Z.

Figure 7:
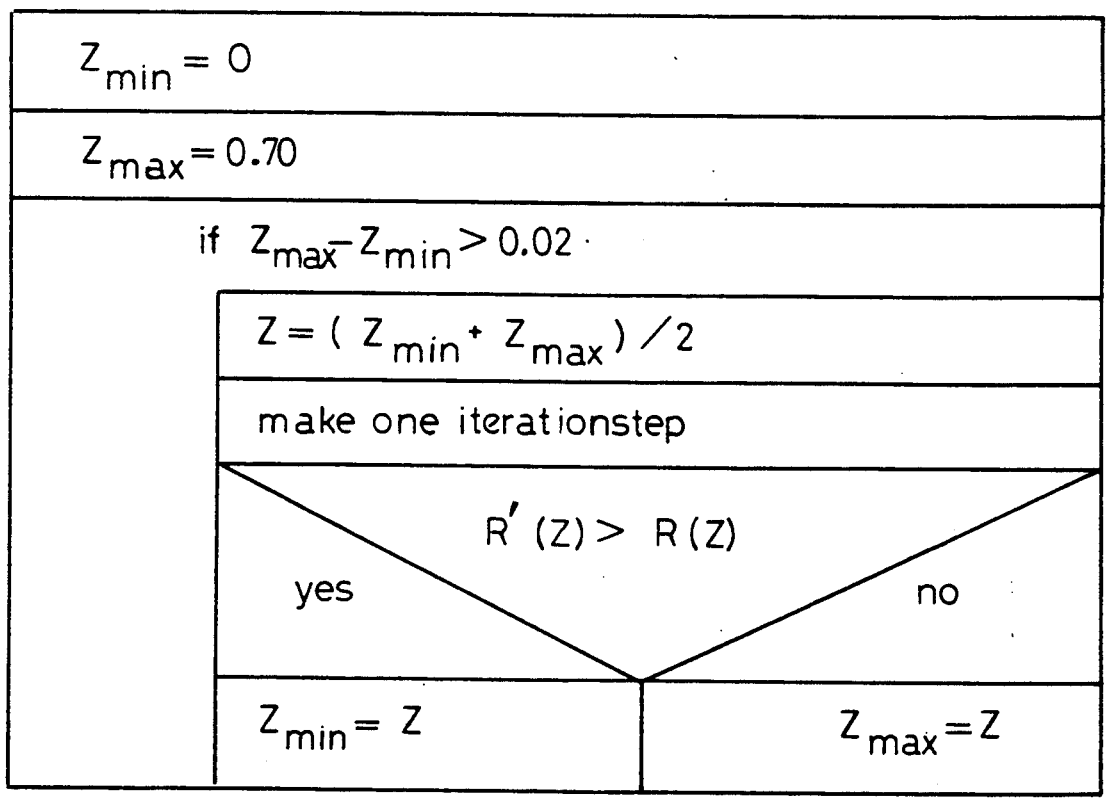
FIG. 7 shows a flow diagram which can be used in the apparatus according to the invention.

As the values for Q and R in table I are monotonously increasing as function of Z, Z can be determined by binary searching. The algorithm thus obtained is shown in FIG. 7.

By means of this algorithm the Z-value is enclosed between two subsequent values from table I. Of $Z_{min}$ and $Z_{max}$ finally that value is chosen for which the difference between R(Z) and R'(Z) is the smallest.

Further the processor 13 is adapted to compute an optimum value of the minimum remanent vertical force at an optimum relative damping factor Z which is introduced for example by means of a keyboard 14. If Z=0.4 is introduced, the optimum value is computed as follows:

$F_{opt} = F_{ref}/R(0.40)$, wherein $F_{ref}$ has been determined in the above computation and R follows from table I for the introduced value of Z.

The optimum value of the minimum remanent vertical force is then obtained by substracting $F_{opt}$ from the average measured value of F.

The determined optimum value of the minimum remanent force and the determined value of the relative damping factor can be shown on a suitable display 15.

It is noted that is is also possible to retrieve a Z value from a table with predetermined optimum Z values for different types of vehicles.

I claim:

1. Apparatus for testing wheel suspension of a vehicle, in particular a shock absorbing element of said wheel suspension, wherein the vehicle has an upsprung mass at each wheel to be tested, said apparatus comprising:
   a measuring plate;
   means for oscillating said measuring plate with a frequency varying in a predetermined range, wherein a tire of the vehicle to be tested exerts vertical forces on the measuring plate during oscillation;
   means for measuring values of the vertical forces exerted by the tire of the vehicle on the measuring plate and for measuring values of the corresponding frequency oscillation;
   means for storing the vertical force values and the corresponding frequency oscillation values;
   means for storing a mathematical model of a linear second order mass spring system formed by the upsprung mass at each wheel to be tested, a tire and a shock absorbing element, said mathematical model representing the performance of the wheel suspension in the range around resonance frequency;
   a logic circuit for determining a minimum vertical force value and corresponding frequency value from said stored vertical force values and corresponding frequency values and for using the mathematical model to compute a relative damping factor as a test result for the wheel suspension from said minimum vertical force value and corresponding frequency value.

2. Apparatus according to claim 1, wherein said logic circuit is adapted to determine a reference force value and a corresponding reference frequency value from said stored vertical force values and corresponding frequency values, said reference force value and said corresponding reference frequency value being substantially independent of the relative damping factor, wherein the relative damping factor is determined as a ratio of the reference force value and the minimum force value.

3. Apparatus according to claim 1 wherein said means for storing the mathematical model comprises a memory for storing a table of relative damping factors, and corresponding ratios of reference force values and minimum force values, and corresponding ratios of reference frequency values and minimum frequency values.

4. Apparatus according to claim 2 wherein means are provided for introducing a predetermined relative damping factor wherein said logic circuit is adapted to use the mathematical model to determine an optimum minimum force value from said predetermined relative damping factor and the reference force value.

5. The apparatus of claim 1 wherein the frequency of the oscillating measuring plate varies in a range between 0 and 25 Hz.

* * * * *